United States Patent
Xuan et al.

(10) Patent No.: US 9,363,717 B2
(45) Date of Patent: Jun. 7, 2016

(54) TRIGGERING A HANDOVER PROCESS BASED ON THE ACTIVITY OF A CONNECTION

(75) Inventors: Zhiyi Xuan, Täby (SE); Walter Müller, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 119 days.

(21) Appl. No.: 14/344,829

(22) PCT Filed: Sep. 14, 2011

(86) PCT No.: PCT/SE2011/051109
§ 371 (c)(1),
(2), (4) Date: Mar. 13, 2014

(87) PCT Pub. No.: WO2013/039434
PCT Pub. Date: Mar. 21, 2013

(65) Prior Publication Data
US 2014/0378142 A1    Dec. 25, 2014

(51) Int. Cl.
*H04W 36/00* (2009.01)
*H04W 88/02* (2009.01)
*H04W 88/08* (2009.01)

(52) U.S. Cl.
CPC ...... *H04W 36/0055* (2013.01); *H04W 36/0088* (2013.01); *H04W 36/0094* (2013.01); *H04W 88/02* (2013.01); *H04W 88/08* (2013.01)

(58) Field of Classification Search
CPC ..... H04W 36/30; H04W 36/32; H04W 38/18; H04W 36/04
USPC .................................. 455/436–444; 370/331
See application file for complete search history.

(56) References Cited

U.S. PATENT DOCUMENTS

2007/0054689 A1* 3/2007 Baker ................... H04L 1/0026
                                                    455/522
2010/0297955 A1* 11/2010 Marinier ........... H04W 36/0061
                                                    455/73

(Continued)

FOREIGN PATENT DOCUMENTS

| EP | 1276344 A1 | 1/2003 |
| GB | 2421148 A | 6/2006 |
| WO | 2006062306 A1 | 6/2006 |

OTHER PUBLICATIONS

3GPP TS 36.331 V10.0.0 (Dec. 2010), 3rd Generation Partnership Project; Technical Specification Group Radio Access Network; Evolved Universal Terrestrial Radio Access (E- UTRA); Radio Resource Control (RRC); Protocol specification (Release 10), 276 pages.

*Primary Examiner* — Christopher M Brandt
*Assistant Examiner* — Matthew Genack
(74) *Attorney, Agent, or Firm* — Rothwell, Figg, Ernst & Manbeck, P.C.

(57) ABSTRACT

Embodiments herein relates to a radio network node (12) for controlling a handover process of a user equipment (10) from a first cell (11) to a second cell (14). The user equipment (10) is served in the first cell configured to be controlled by the radio network node. The radio network node comprises an operating circuit configured to operate according to a handover process, which handover process is triggered by a first trigger parameter when a connection to the user equipment is active, and by a second trigger parameter when the connection to the user equipment is inactive.

22 Claims, 9 Drawing Sheets

(56) References Cited

U.S. PATENT DOCUMENTS

2011/0263260 A1* 10/2011 Yavuz ............... H04W 36/0083 455/437

2011/0269464 A1* 11/2011 Xu ................... H04W 36/0033 455/436

* cited by examiner

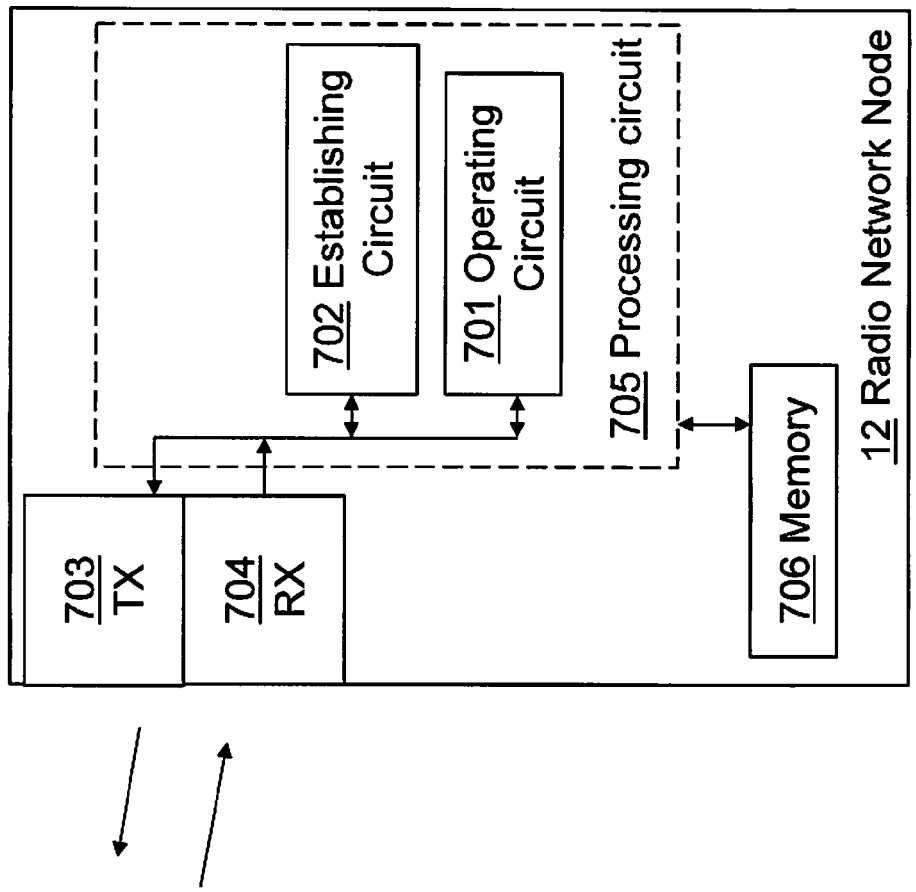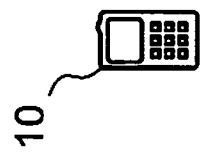
Fig. 7

TRIGGERING A HANDOVER PROCESS BASED ON THE ACTIVITY OF A CONNECTION

CROSS REFERENCE TO RELATED APPLICATION(S)

This application is a 35 U.S.C. §371 National Phase Entry Application from PCT/SE2011/051109, filed Sep. 14, 2011, designating the United States, the disclosure of which is incorporated herein in its entirety by reference.

TECHNICAL FIELD

Embodiments herein relate to a network node, a user equipment and methods therein. In particular, embodiments herein relate to handle a handover process of the user equipment from a first cell to a second cell.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

In LTE a user equipment in a connected mode, such as Radio Resource Control (RRC)_CONNECTED mode, measures a signal strength, e.g. Reference Symbol Received Power (RSRP), or signal quality, e.g. Reference Symbol Received Quality (RSRQ), of the serving cell and neighboring cells. The user equipment reports measurement results in a measurement report when measurements fulfill an event criterion defined by the radio base station. One event criterion, also referred to as event A3, is fulfilled when a neighbor cell gets a certain amount, a threshold, stronger than the serving cell for at least a certain minimum time. This event criterion is typically used as trigger for handover, i.e. a handover of the user equipment is initiated by the radio base station to the neighbor cell that fulfills the event criterion and have enough resources to support the UE connection. There might be cases when several neighbor cells fulfill this criterion. If this happens the user equipment sends a list including those cells to the radio base station.

The tuning, also called handover tuning, of the thresholds used for triggering handover is determined making the handover as early as possible but still late enough to avoid handover back again. This is accomplished by tuning the handover margin to a suitable compromise that avoids too many and frequent handovers, such as oscillating handovers. The handover tuning is for simplicity typically done on network level, e.g. radio base station in LTE, a base station controller in GSM, or a radio network controller in WCDMA, and may consider parameters such as large and small cells, fast and slow moving user equipments, and varying propagation conditions e.g. street level, indoor or open areas.

Increasing handover margin will mitigate too frequent handovers but will also cause delayed handover initialization, thereby degrading the throughput before the handover is triggered and eventually also increased drop rate. Increasing filtering of the measured quantity and time to trigger, e.g. Layer 3 (L3) filtering, used for the event evaluation will also mitigate too frequent handovers and unfortunately also cause delayed handover initialization but not to the same extent as increased handover margin.

Known solutions for reducing handover frequency in average and still avoiding the drawbacks are to adjust the handover margin for a specific user equipment. This is typically based on recognizing that a user equipment need to do handover soon again after just having performed handover and that the indicated target is the most recent visited cell, thus detecting an oscillating handover and adjust the handover margin for that specific user equipment temporarily as an effort to mitigate the detected oscillation tendencies. This, however, requires a large amount of computational capacity as well as radio resources and is a complicated process.

SUMMARY

It is an object of embodiments herein to provide a high performance of the radio communications network supporting mobility in an efficient manner.

According to an aspect of embodiments herein the object is achieved by a method in radio network node for controlling a handover process of a user equipment from a first cell to a second cell. The user equipment is served in the first cell controlled by the radio network node. The radio network node operates according to a handover process, which handover process is triggered by a first trigger parameter when a connection to the user equipment is active and by a second trigger parameter when the connection to the user equipment is inactive.

According to still another aspect the object is achieved by a radio network node for controlling a handover process of a user equipment from a first cell to a second cell. The user equipment is served in the first cell configured to be controlled by the radio network node. The radio network node comprises an operating circuit configured to operate according to a handover process, which handover process is triggered by a first trigger parameter when a connection to the user equipment is active, and by a second trigger parameter when the connection to the user equipment is inactive.

According to still another aspect the object is achieved by a method in a user equipment for reporting measurement report enabling handover of the user equipment from a first cell to a second cell. The user equipment is served in the first cell controlled by a radio network node. The user equipment receives a first trigger parameter and a second trigger parameter. The first trigger parameter triggers a handover process when a connection between the radio network node and the user equipment is active. The second trigger parameter triggers the handover process when the connection is inactive. The user equipment measures signal strengths of the first cell and the second cell. Furthermore, the user equipment transmits a first measurement report indicating the signal strengths of the first cell and the second cell when the first trigger parameter is fulfilled and a second measurement report indicating signal strengths of the first cell and the second cell when the second trigger parameter is fulfilled.

According to yet another aspect the object is achieved by a user equipment for reporting measurement report enabling handover of the user equipment from a first cell to a second cell. The user equipment is configured to be served in the first cell controlled by a radio network node. The user equipment comprises a receiver configured to receive a first trigger parameter and a second trigger parameter. The first trigger parameter triggers a handover process when a connection between the radio base station and the user equipment is active. The second trigger parameter triggers the handover process when the connection is inactive. The user equipment further comprises a measuring circuit configured to measure signal strengths of the first cell and the second cell. The user equipment furthermore comprises a transmitter configured to transmit a first measurement report indicating the signal strengths of the first cell and the second cell when the first trigger parameter is fulfilled. The transmitter is further configured to transmit a second measurement report indicating signal strengths of the first cell and the second cell when the second trigger parameter is fulfilled.

Thus, by using embodiments disclosed herein a flexible tuning between frequent handovers and drop rate is provided since the handover process is based on whether the connection to the user equipment is active or not. This improves the performance of the radio communications network perceived by the end user as the number of handovers is reduced without causing performance degradation.

BRIEF DESCRIPTION OF THE DRAWINGS

Embodiments will now be described in more detail in relation to the enclosed drawings, in which:

FIG. 7 is a block diagram depicting a radio network node according to some embodiments herein.

DETAILED DESCRIPTION

Figure 1:
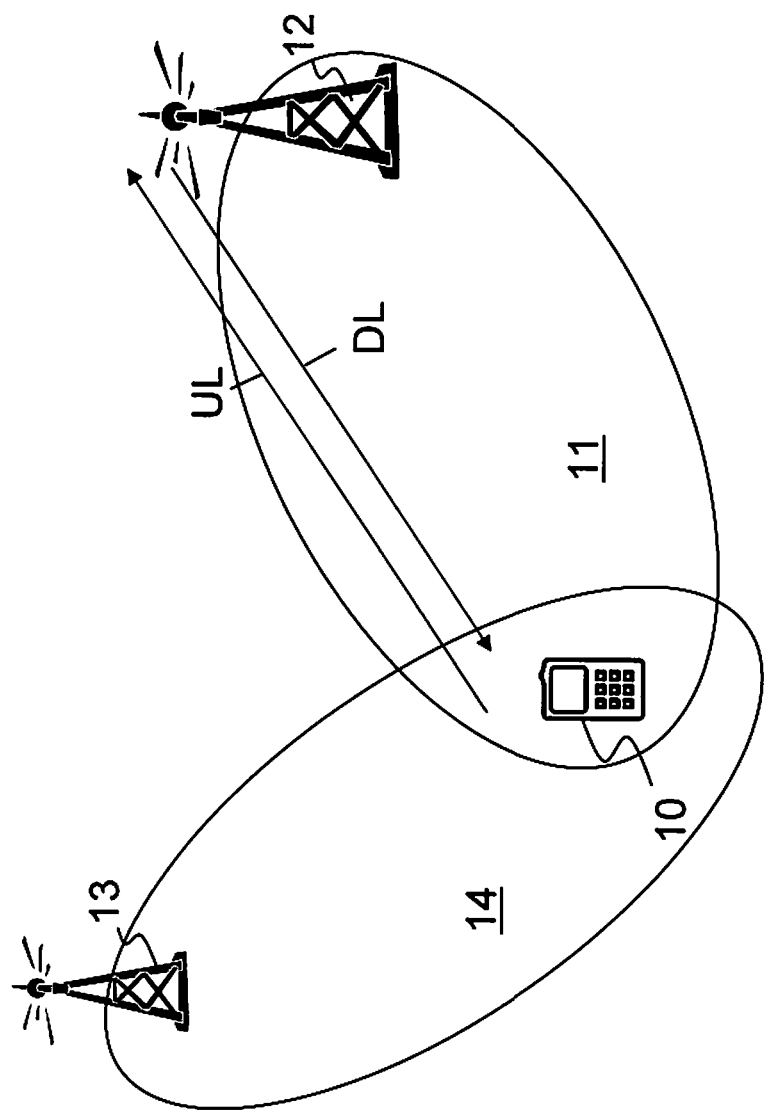
FIG. 1 is a schematic overview depicting a radio communications network according to some embodiments herein.

FIG. 1 is a schematic overview of a radio communications network such as LTE, LTE-Advanced, WCDMA, GSM/EDGE, WiMax, or UMB, network just to mention a few possible implementations. The radio communications network comprises a radio network node, such as a first radio base station 12, providing radio coverage over at least one geographical area forming a first cell 11. A user equipment 10 is served in the first cell 11 by the first radio base station 12 and is communicating with the first radio base station 12. The first cell 11 is thus a serving cell to the user equipment 10 in this example. The user equipment 10 transmits data over a radio interface to the first radio base station 12 in an uplink (UL) transmission and the first radio base station 12 transmits data to the user equipment 10 in a downlink (DL) transmission. The radio communications network may further comprise a second radio base station 13. The second radio base station 13 provides radio coverage over another geographical area forming a second cell 14, also referred to as neighbour cell 14.

It should be understood by the skilled in the art that "user equipment" is a non-limiting term which means any wireless terminal, device or node e.g. Personal Digital Assistant (PDA), laptop, mobile, sensor, relay, mobile tablets or even a small base station communicating within respective cell.

The respective radio base station 12,13 may also be referred to as e.g. a NodeB, an evolved Node B (eNB, eNode B), a base transceiver station, Access Point Base Station, base station router, or any other network unit capable to communicate with a user equipment within the cells served by the respective radio base station 12,13 depending e.g. of the radio access technology and terminology used. The radio network node may also be represented by a beacon station or a relay station.

According to embodiments herein, the first radio base station 12 may configure a first event criterion. The first event criterion may define that the user equipment 10 is to report received signal strengths when strengths of signals from neighbour cell 14 becomes offset better than a threshold, also called handover margin. The first radio base station 12 may configure the first event criterion for Intra frequency cells at initial setup. The handover margin comprises an offset plus hysteresis. Hence, signal strengths from neighbour cells, e.g. the second cell 14, need to exceed the serving cell signal strength by the handover margin to trigger handover. Thus, the handover margin is the sum of the hysteresis plus the offset. The hysteresis is a value by which a signal strength of the neighbour cell 14 must exceed a signal strength of the first cell 11, being the serving cell. Handover margin creates an interval around a cell border of the first cell 11 to avoid the ping pong handovers, also referred to as oscillating handovers. The handover margin for both RSRP and RSRQ may e.g. be 3 dB. This means that a handover to the second cell 14 is considered when the measurement quantity used for the event evaluation from the second cell 14 is 3 dB stronger than that from the first cell 11. Optionally a second event criterion with different parameter settings may also be configured, such as different time to trigger settings.

The first radio base station 12 may establish or detect whether a connection to the user equipment 10 is inactive or active. An active connection, an active user equipment for short, is a connection to the user equipment 10 with data that has been scheduled by the first radio base station 12 or indicated to have data for data transfer in DL or UL within latest X seconds. X is a time period which is possible to tune. E.g. the first radio base station 12 may assume the user equipment 10 to be active a little while longer than an actual time a transmission from the user equipment 10 takes. An inactive connection, an inactive user equipment for short, is a connection to the user equipment 10 with data that has not been scheduled by the first radio base station 12 or indicated to have no data for data transfer in DL or UL within the latest X seconds. Thus, a user equipment that is not using Radio Bearers for data transmission at the moment and have not done so for a while is established to have an inactive connection. In other words, the first radio base station 12 establishes the activity of an "active mode" user equipment during a short period of time. Note that using Signaling Bearers for handover signaling may not be counted as activity.

Embodiments herein operate the handover process based on the established activity of the connection to the user equipment 10. Thus, when the connection is active a first trigger parameter, e.g. a handover margin and/or a time to trigger, may be of a first value and when the connection is inactive a second trigger parameter may be of a second value, which is different than the first value. For example, the handover margin may be larger for a user equipment with an inactive connection before initialising the handover process. Furthermore, the time to trigger may be shorter for a user equipment with an inactive connection as the handover margin is larger indicating a more certain handover. The increased handover margin may be achieved in several ways as will be described below.

Embodiments herein assume that it is acceptable to delay the handover if the user equipment 10 is not using the Radio Bearers for user data transfer at the moment and is less probable to do so also in the near future. Some embodiments herein also assumes that for some Radio Bearers used for a certain service, e.g. for a service with a Best Effort Quality of service, it is acceptable to actually take the risk to increase the drop rate by using larger handover margin especially since user equipments reconnect in a short time without any actions needed by an end user. Embodiments herein make it possible to use larger handover margin for inactive user equipments as compared to the smaller handover margin used for active user equipments. Thus, the number of handovers will be reduced for inactive user equipments and the drop rate for active user equipments will be reduced.

Figure 2:
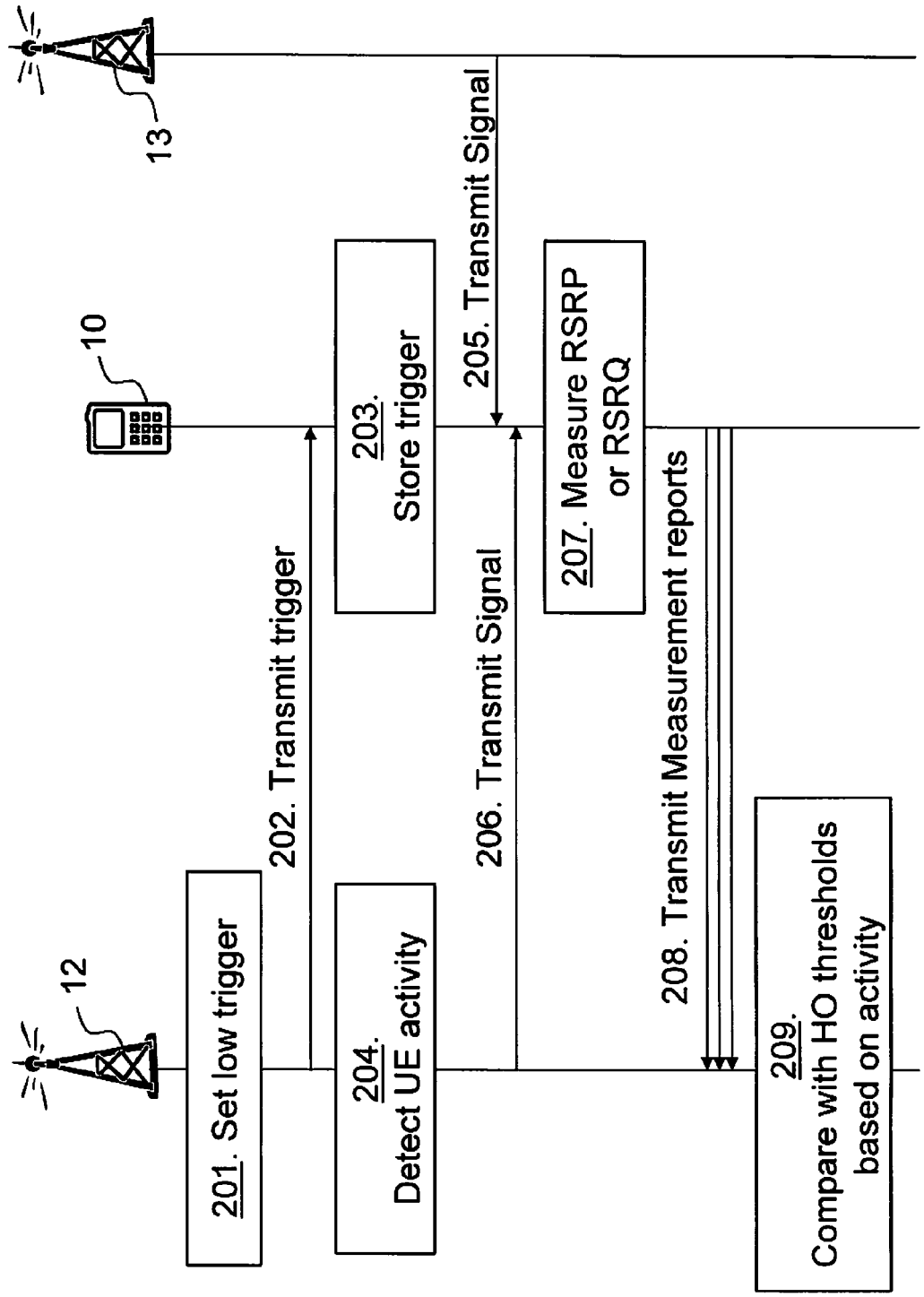
FIG. 2 is a combined flowchart and signalling scheme according to some embodiments herein.

FIG. 2 is a combined flow chart and signaling scheme in a radio communications network exemplifying some embodiments using different trigger parameters for active user equipments and inactive user equipments. The steps may be taken in any suitable order.

Step 201. The first radio base station 12 sets a trigger value, also referred to as low trigger, which in this example is different that the above mentioned first and second trigger parameters. The trigger value is to trigger the user equipment 10 to send a measurement report indicating a cell relation, or a handover from the first cell 11 to the second cell 14. The trigger value is set as an initial value indicating a rather weak signal from the second radio base station 13. For example, the first radio base station 12 set a low handover margin and use event triggered periodic reporting from the user equipment 10.

Step 202. The first radio base station 12 transmits the trigger value to the user equipment 10.

Step 203. The user equipment 10 stores the trigger value at the user equipment 10.

Step 204. The first radio base station 12 detects the activity in the connection to the user equipment 10.

Step 205. The second radio base station 13 transmits a signal e.g. on a Physical Broadcast Channel (PBCH) or similar carrying system information over the first cell 11.

Step 206. The first radio base station 12 transmits a signal e.g. on a PBCH or similar carrying system information over the second cell 14.

Step 207. The user equipment 10 periodically performs downlink radio channel measurements based on the reference symbols (RS); namely, the user equipment 10 may measure the reference symbols received power (RSRP) and/or the reference symbols received quality (RSRQ) of received signals, e.g. the signals from the first and second radio base station 12,13.

Step 208. The user equipment 10 periodically reports the signal measurements in measurement reports, also called event triggered periodical report. The measurement reports are triggered to be transmitted by the trigger value, thus, when certain network configured conditions are satisfied, called event A3, the user equipment 10 transmits the corresponding measurement report indicating the triggered event and keep on doing periodic reporting until event A3 conditions are not valid for any cell. In addition, the measurement report indicates the best cell to which the user equipment 10 may be handed over, which is termed "target" cell.

Step 209. The first radio base station 12 compares the reported signal strengths with handover thresholds, which correspond to the trigger parameters mentioned above, stored at the first radio base station 12. The handover thresholds are based on the activity of the connection to the user equipment 10. For user equipments with an active connection, the handover will be initialized immediately when the target cell, e.g. the second cell 14, is stronger than the serving cell, e.g. first cell 11. E.g. the first trigger parameter may define that the target cell is stronger than source cell with 3 dB. For user equipments with an inactive connection, the first radio base station 12 may wait until the event triggered periodical report indicates that a signal strength from a neighbor cell, e.g. the second cell 14, fulfills a larger handover margin before the handover preparation/execution is initialized. E.g. the second trigger parameter may define that the target cell is stronger than the source cell with 6 dB. Thus, the first radio base station 12 operates according to a handover process triggered by the first trigger parameter when the connection to the user equipment 10 is active. The handover process is triggered by the second trigger parameter when the connection to the user equipment 10 is inactive.

Figure 3:
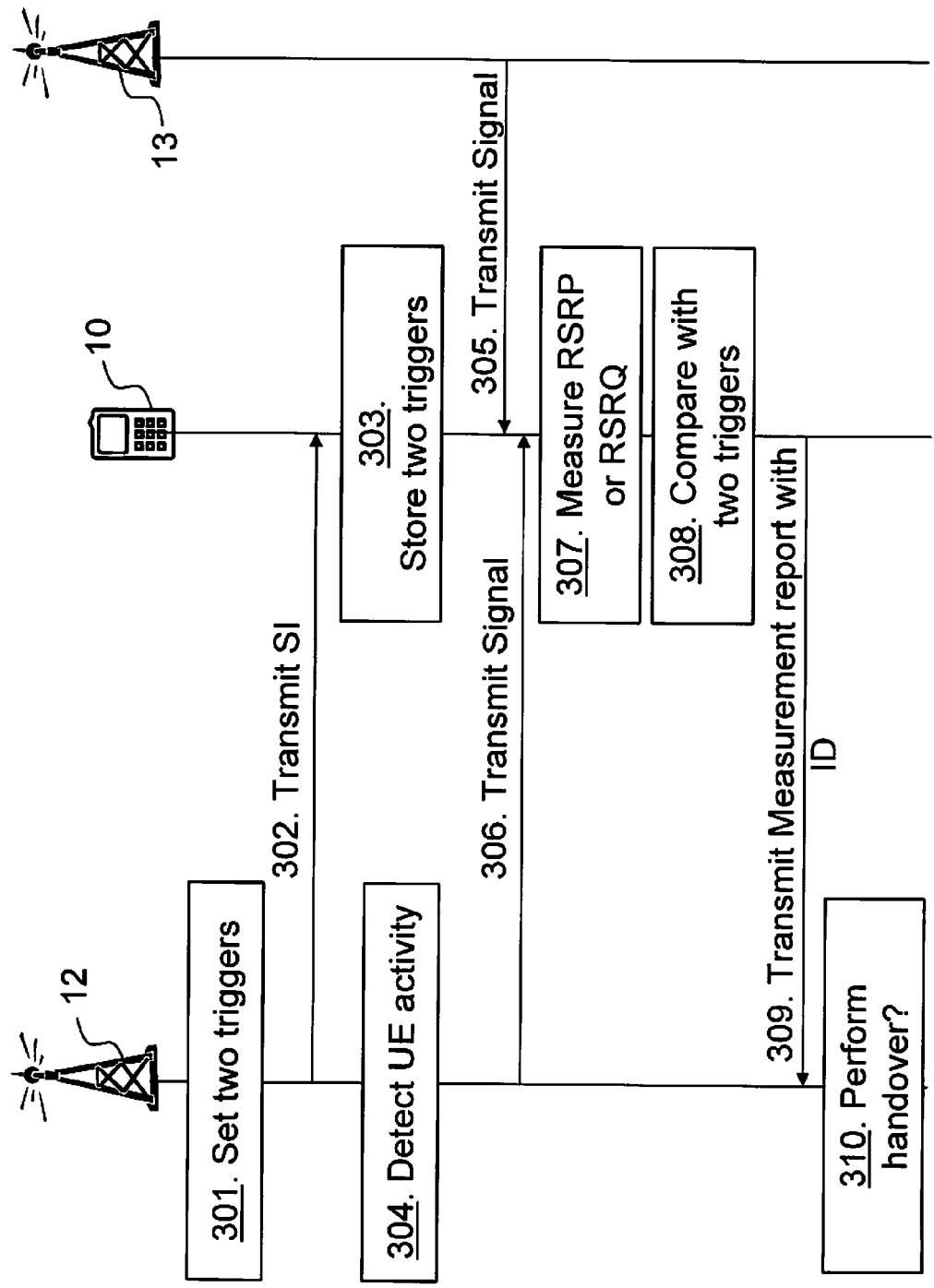
FIG. 3 is a combined flowchart and signalling scheme according to some embodiments herein.

FIG. 3 is a combined flow chart and signaling scheme in a radio communications network exemplifying some additional embodiments using different trigger parameters for active user equipments and inactive user equipments. The steps may be taken in any suitable order. The user equipment 10 is connected to the radio base station 12 over a connection, that is, the user equipment 10 is in active mode.

Step 301. The first radio base station 12 sets two triggers, a first and a second trigger parameter. The first trigger parameter is to trigger a handover process when the connection to the user equipment 10 is active. The second trigger parameter is to trigger the handover process when the connection to the user equipment 10 is inactive. The first and second trigger parameters may comprise 'event A3's.

Step 302. The first radio base station 12 transmits these trigger parameters to the user equipment 10 e.g. broadcasting the first and second trigger parameters in the system information (SI) within the first cell 11.

Step 303. The user equipment 10 stores the first and second trigger parameters, which have been read by decoding the system information.

Step 304. The first radio base station 12 may continuously establish whether the connection to the user equipment 10 is active or not. Thus, the first radio base station 12 detects activity of the user equipment 10, e.g. by analyzing UL/DL data to the user equipment 10 over a period of time. This step corresponds to the step 204 in FIG. 2.

Step 305. The second radio base station 13 transmits a signal over e.g. a pilot channel, a broadcast channel, or similar. This step corresponds to the step 205 in FIG. 2.

Step 306. The first radio base station 12 transmits a signal over e.g. a pilot channel, a broadcast channel, or similar. This step corresponds to the step 206 in FIG. 2.

Step 307. The user equipment 10 periodically performs downlink radio channel measurements based on the Reference Symbols (RS); namely, the user equipment 10 may measure the reference symbols received power (RSRP) or/and the reference symbols received quality (RSRQ). This step corresponds to the step 207 in FIG. 2.

Step 308. The user equipment 10 compares the difference of the measurements of the signals from the different cells. The difference in signal strengths is compared to the first trigger parameter and also compared to the second trigger parameter.

Step 309. The user equipment 10 transmits a measurement report when the difference in signal strength of the cells exceeds the first trigger parameter. In some embodiments, the difference should also last and exceed a period in time, e.g. Time To Trigger (TTT), set as a first trigger parameter when a number of first trigger parameters is used. The measurement report then comprises an identity (ID) identifying the measurement report as a measurement report associated with the first trigger parameter. Furthermore, the user equipment 10 transmits a measurement report when the difference in signal strength of the cells exceeds the second trigger parameter. In some embodiments, the difference should also last and exceed a period in time, e.g. Time To Trigger (TTT), set as a second trigger parameter when a number of second trigger parameters is used. The measurement report then comprises an identity (ID) identifying this measurement report as a measurement report associated with the second trigger parameter.

Step 310. The first radio base station 12 receives the measurement report and determines to perform the handover based on the ID in the measurement report and the detected activity of the user equipment 10. For example, when the measurement report is associated with the first trigger parameter, and the connection is established to be inactive, the first radio base station 12 does not initiate a handover process. However, when the measurement report is associated with the first trigger parameter and the connection is established to be active, or similarly, when the measurement report is associated with the second trigger parameter and the connection is established to be inactive, the first radio base station 12 initiates a handover process of the user equipment 10 to the second cell 14.

Thus, the first radio base station 12 may use two instances of event A3 with different handover margin set. The two instances of event A3 are distinguished by separate measurement ID in the measurement report. For user equipments with an active connection the handover process may be initialized when receiving a measurement report for the event configured with small handover margin, that is, the first trigger parameter is met. For user equipments with an inactive connection the handover process may be initialized by the first radio base station 12 when receiving a measurement report for the event configured with large handover margin, that is, the second trigger parameter is met.

Figure 4:
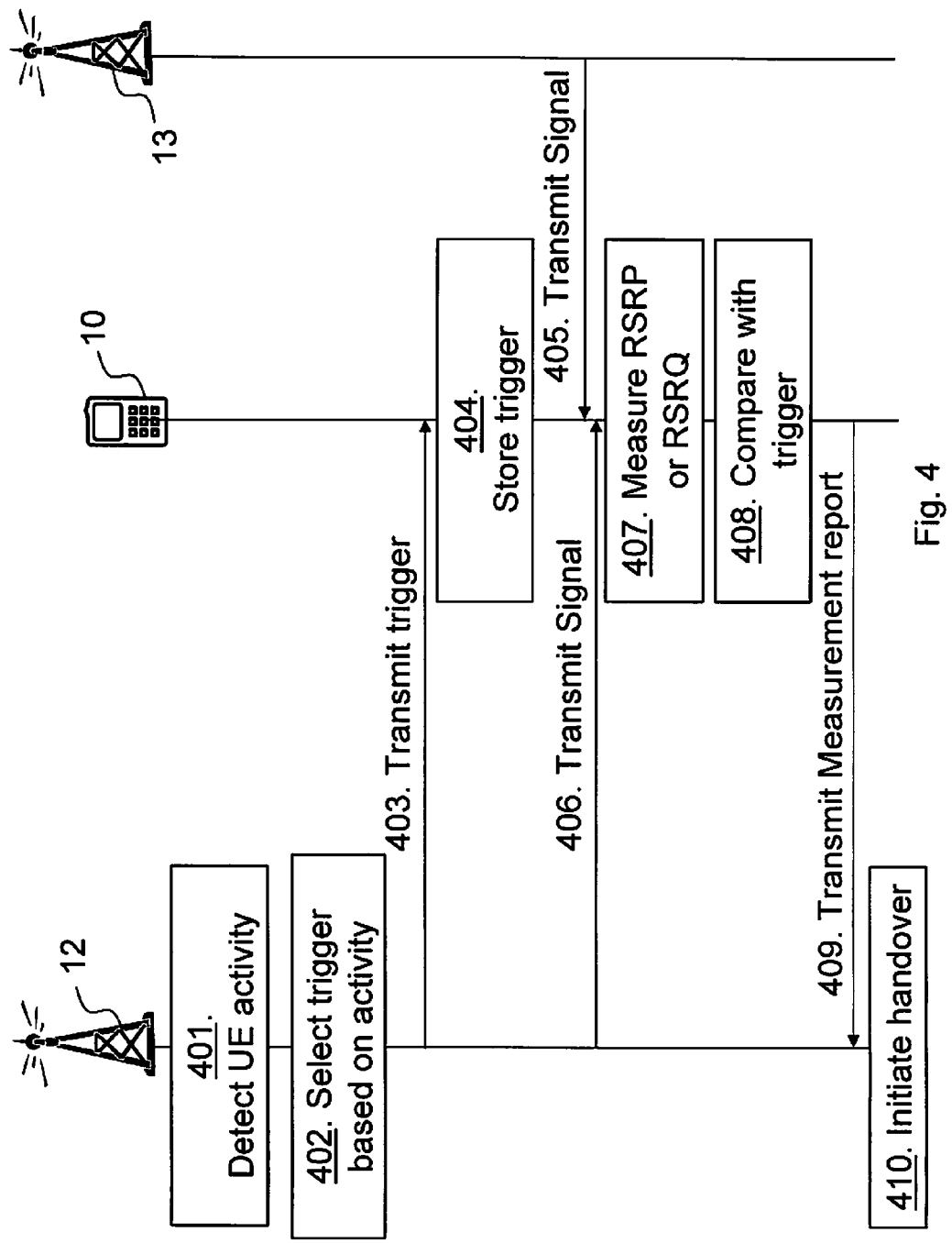
FIG. 4 is a combined flowchart and signalling scheme according to some embodiments herein.

FIG. 4 is a combined flowchart and signaling scheme in the radio communications network illustrating some additional embodiments using different trigger parameters for active user equipments and inactive user equipments. The steps do not have to be taken in the order stated below, but may be taken in any suitable order.

Step 401. The first radio base station 12 may continuously establish whether the connection to the user equipment 10 is active or not. Thus, the first radio base station 12 detects activity of the user equipment 10, e.g. by analyzing UL/DL data from or to the user equipment 10 over a period of time. This step corresponds to the step 204 in FIG. 2 and step 304 in FIG. 3.

Step 402. The first radio base station 12 selects a first trigger parameter or a second trigger parameter, e.g. a signal difference threshold also referred to as handover margin, a TTT, or similar, based on the established activity. For example, the first radio base station 12 selects a first handover margin when the connection to the user equipment is established to be active.

Step 403. The selected first or second trigger parameter is then transmitted from the first radio base station 12 to the user equipment 10. In the illustrated example the connection is established to be active and thus the first trigger parameter is transmitted.

Step 404. The user equipment 10 stores the received trigger parameter, e.g. the first trigger parameter.

Step 405. The second radio base station 13 transmits a signal over e.g. a pilot channel, a broadcast channel, or similar. This step corresponds to the step 205 in FIG. 2, and step 305 in FIG. 3.

Step 406. The first radio base station 12 transmits a signal over e.g. a pilot channel, a broadcast channel, or similar. This step corresponds to the step 206 in FIG. 2 and step 306 in FIG. 3.

Step 407. The user equipment 10 periodically performs downlink radio channel measurements based on the RS; namely, the user equipment 10 may measure the RSRP or and the RSRQ. This step corresponds to the step 207 in FIG. 2 and step 307 in FIG. 3.

Step 408. The user equipment 10 compares downlink radio channel measurements with the stored trigger parameter. Actually, a difference of the downlink radio channel measurements of the different cells compared with the first trigger parameter e.g. a handover margin. When e.g. a number first trigger parameters are to be fulfilled in an event A3, the user equipment 10 may compares the difference and a time interval the difference exceeds the handover margin with the stored trigger parameters.

Step 409. The user equipment 10 then transmits a measurement report when the first trigger parameter or parameters are fulfilled.

Step 410. The first radio base station 12 receives the measurement report and initiates a handover process. E.g. the first radio base station 12 communicates with the second radio base station 13 to find out availability of resources at the second radio base station 13 and similar.

Thus, in some embodiments the first radio base station 12 may update the trigger parameter used at the user equipment 10 by transmitting an updated trigger parameter, to the user equipment 10 when the activity over the connection changes. E.g. if the user equipment is detected as being inactive the first radio base station 12 may send the second trigger parameter to the user equipment to use when triggering measurement reporting. Thus, the first radio base station 12 may reconfigure user equipments to use different A3 settings each time the connection changes from being active to an inactive state.

Figure 5:
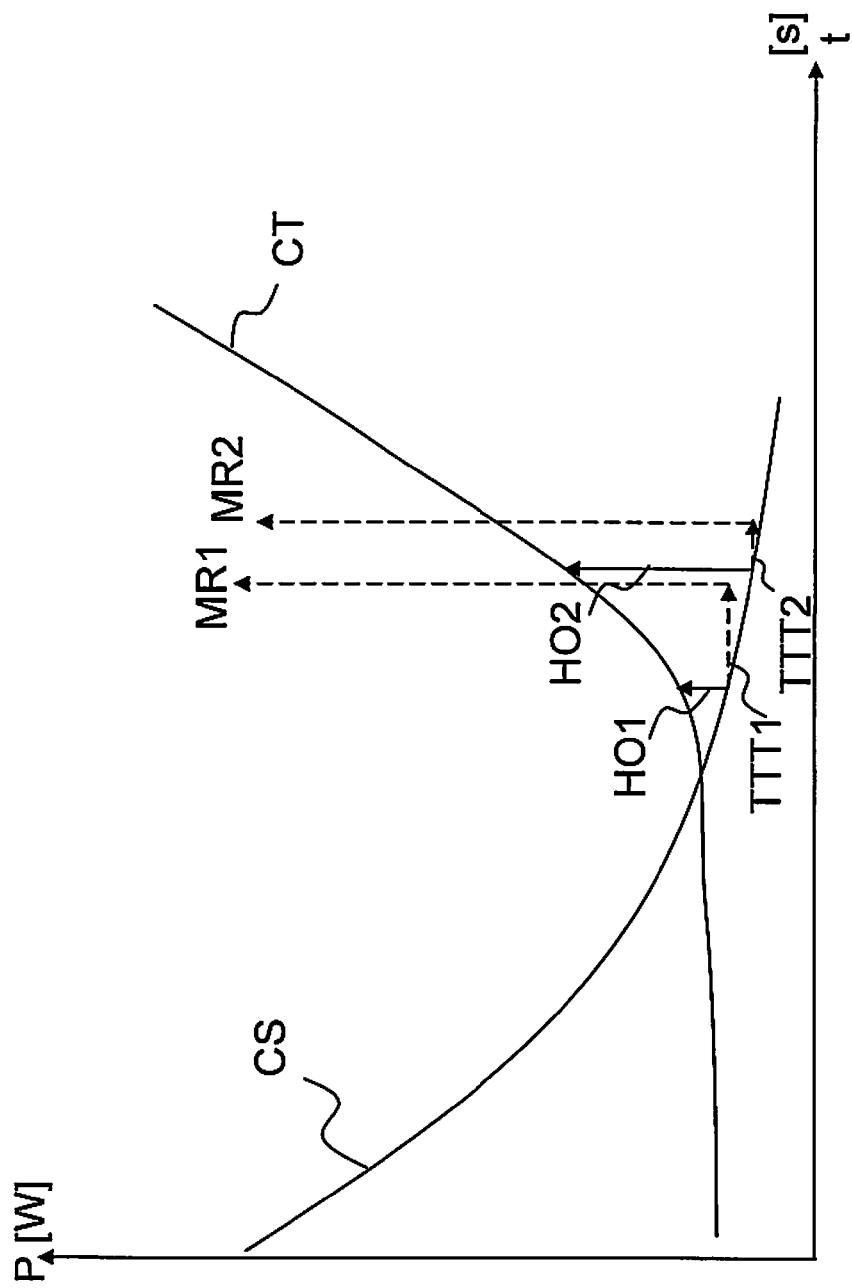
FIG. 5 is a schematic graph depicting signal strengths according to some embodiments herein.

FIG. 5 is a schematic graph depicting a relation between measured signal strength P defined along a y-axis and a time defined along an x-axis. A first curve CS defines the measured signal strength of a source cell, e.g. the first cell 11. A second curve CT defines the measured signal strength of a target cell, e.g. the second cell 14.

When a difference between the second curve CT and the first curve exceeds a first threshold, a first handover (HO) margin HO1, over a pre-set time interval, a first time to trigger TTT1, the user equipment 10 transmits a first measurement report MR1 indicating the signal strengths.

When a difference between the second curve CT and the first curve exceeds a second threshold, a second HO margin HO2, over a pre-set time interval, a second time to trigger TTT2, the user equipment 10 transmits a second measurement report MR2 indicating the signal strengths.

The first handover margin HO1 and the first time to trigger TTT1 is associated to a user equipment with a connection established to be active. The second handover margin HO2 and the second time to trigger TTT2 is associated to a user equipment with a connection established to be inactive. As can be seen the user equipment 10 in an active connection triggers a handover process earlier than the user equipment 10 in an inactive connection.

Embodiments herein disclose a flexible manner to tune between using small handover margin and high handover frequency versus large handover margin and low handover frequency. The tuning flexibility can be utilize to lower the nominal handover margin while the handover frequency is maintained or keep the same handover margin for the user equipment 10 with or in an active connection but still reduce the handover frequency. If an operator would like to have many user equipments in connected mode for a long time to reduce service setup latency, handover signaling load may become a problem. Embodiments herein may reduce the handover signaling load as the number of handovers may be reduced for user equipments with an inactive connection and by that allow long connected times for user equipment's.

Figure 6:
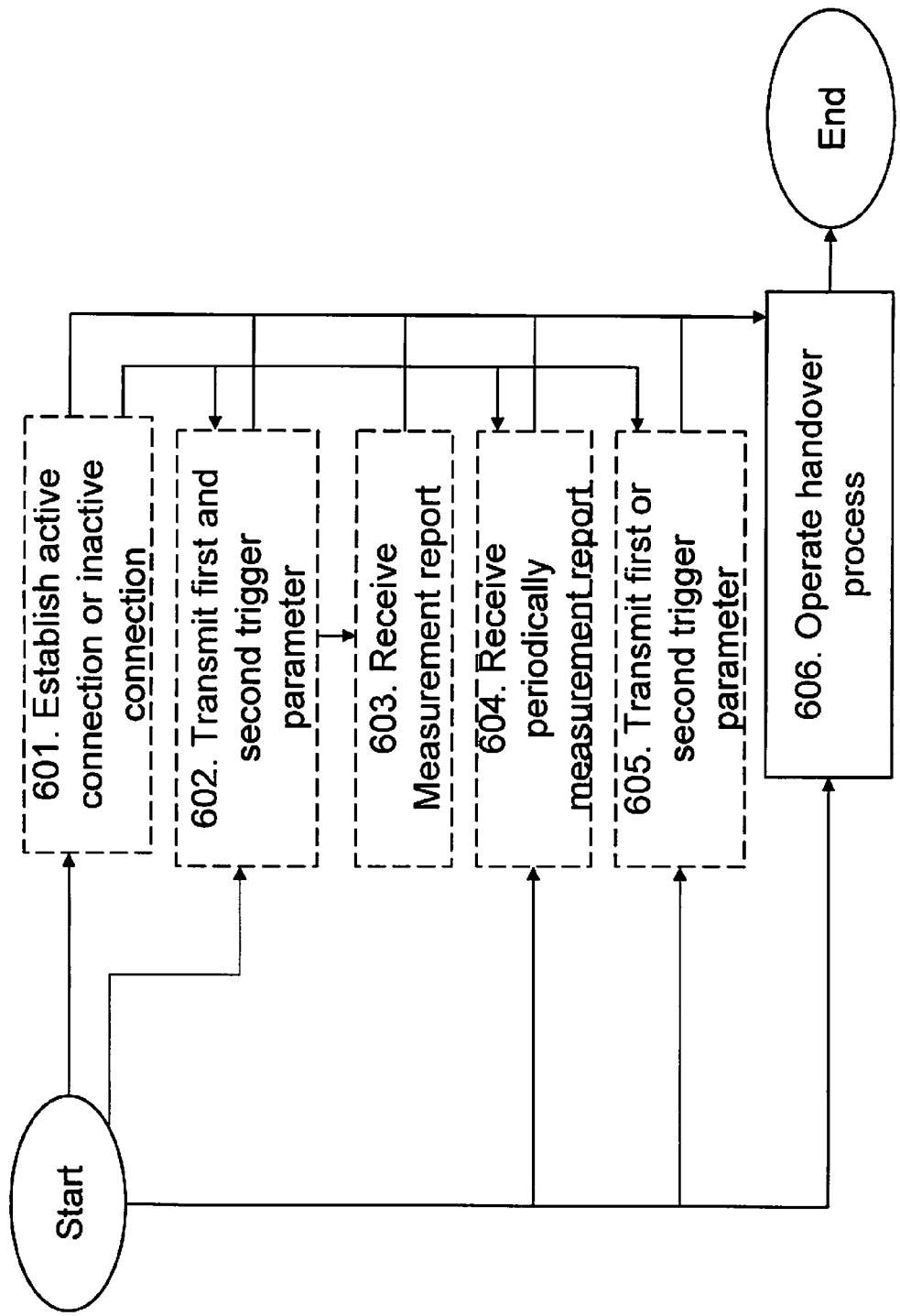
FIG. 6 is a schematic flow chart depicting a method in a radio network node according to some embodiments.

The method steps in the radio network node 12 for controlling a handover process of the user equipment 10 from the first cell 11 to the second cell 14 according to some general embodiments will now be described with reference to a flowchart depicted in FIG. 6. The user equipment 10 is served in the first cell 11 controlled by the radio network node 12. The steps do not have to be taken in the order stated below, but may be taken in any suitable order. Boxes being dashed indicate that these steps are only performed in some embodiments.

Step 601. The radio network node 12 may in some embodiments establish whether the connection to the user equipment 10 is active or inactive. In some embodiments the connection is established as inactive when the user equipment 10 has not had data buffered in the downlink direction nor requested data to be sent in the uplink within a time interval. In some embodiments the connection is established as active when the user equipment 10 has had data buffered in the downlink direction or requested data to be sent in the uplink within the time interval. This step corresponds to step 204 in FIG. 2, step 304 in FIG. 3, or step 401 in FIG. 4.

Step 602. The radio network node 12 may in some embodiments transmit to the user equipment 10, the first trigger parameter for reporting signal strength measurement from the user equipment 10. Furthermore, the radio network node 12 may transmit the second trigger parameter for reporting signal strength measurement from the user equipment 10. In some embodiment the first trigger parameter indicates a first handover margin and the second trigger parameter indicates a second handover margin, which first handover margin differs from the second handover margin. In some embodiments the first trigger parameter indicates a first time period to report signal measurement, and the second trigger parameter indicates a second time period to report signal measurement. A length of the first time period may be different from a length of the second time period. This corresponds to the step 302 in FIG. 3.

Step 603. The radio network node 12 may in some embodiments receive a measurement report indicating whether the measurement report is triggered by the first trigger parameter or the second trigger parameter. This corresponds to the step 310 in FIG. 3.

Step 604. In some embodiments the first and second trigger parameters influence a handover margin of signal strengths of the first cell 11 and of the second cell 14 in the handover process. The radio network node 12 may periodically in some embodiments receive a measurement report from the user equipment 10. The measurement report indicates signal strengths of the first cell 11 and of the second cell 14.

Step 605. In some embodiments the radio network node 12 transmits the first trigger parameter to the user equipment 10 when the connection is active or the second trigger parameter to the user equipment 10 when the connection is inactive. This corresponds to the step 403 in FIG. 4.

Step 606. The radio network node 12 operates according to a handover process. The handover process is triggered by the first trigger parameter when a connection to the user equipment 10 is active, and by the second trigger parameter when the connection to the user equipment 10 is inactive. For example, a plurality of first trigger parameters may comprise an offset of e.g. 2 dB, an hysteresis of 1 dB and a TTT of 60 ms. A plurality of second trigger parameters may comprise an offset of 4 dB, an hysteresis of 2 dB and a TTT of 40 ms. Thus, one may say that the radio network node operates according to a first handover process when the connection is detected active and according to a second handover process when the connection is detected as inactive.

In some embodiments the first trigger parameter and second trigger parameter each comprise a parameter influencing a handover margin of signal strengths of the first cell 11 and the second cell 14 in the handover process and/or a time period to trigger the reporting of signal strengths from the user equipment 10.

In some embodiments the operating comprises to initiate the handover process when a difference of the signal strengths in periodically received measurement reports is above a first threshold value and when the connection to the user equipment 10 is active, or when the difference of the signal strengths is above a second threshold value and when the connection to the user equipment 10 is inactive. The first threshold value is lower than the second threshold value and wherein the first threshold value is associated with the first trigger parameter and the second threshold value is associated with the second trigger parameter. It should here be understood that the method depends on the activity of a user equipment in active mode.

FIG. 7 is a block diagram depicting embodiments of a radio network node 12, such as the first radio base station 12 for controlling a handover process of a user equipment 10 from a first cell 11 to a second cell 14. The radio network node 12 is configured to control the first cell 11 serving the user equipment 10.

The radio network node 12 comprises an operating circuit 701 configured to operate according to a handover process. The handover process is triggered by a first trigger parameter when a connection to the user equipment 10 is active. Alternatively is the handover process triggered by a second trigger parameter when the connection to the user equipment 10 is inactive.

Furthermore, the radio network node 12 may comprise an establishing circuit 702 configured to establish whether the connection to the user equipment 10 is active or inactive.

Additionally, the radio network node 12 comprise a transmitter 703 that may in some embodiments be configured to transmit, to the user equipment 10, the first trigger parameter for reporting signal strength measurement from the user equipment 10, and the second trigger parameter for reporting signal strength measurement from the user equipment 10. The first trigger parameter may in some embodiments indicate a first handover margin and the second trigger parameter may indicate a second handover margin. The first handover margin differs from the second handover margin. In some embodiments the first trigger parameter may indicate a first time period to report signal measurement, and the second trigger parameter indicates a second time period to report signal measurement. A length of the first time period is different from a length of the second time period. In some embodiments may the transmitter 703 be configured to transmit the first trigger parameter to the user equipment 10 when the connection is active or to transmit the second trigger parameter to the user equipment 10 when the connection is inactive.

The radio network node comprises a receiver 704 that in some embodiments is configured to receive a measurement report indicating whether the measurement report is triggered by the first trigger parameter or the second trigger parameter. For example, the measurement report may comprise an ID identifying the measurement report as triggered by the first or second trigger parameter. In some embodiments the first and second trigger parameters influence a handover margin of signal strengths of the first cell 11 and of the second cell 14 in the handover process. Then, the receiver 704 may be configured to periodically receive a measurement report from the user equipment 10. The measurement report indicates signal strengths of the first cell 11 and of the second cell 14. The operating circuit 701 may then be configured to initiate the handover process when a difference of the signal strengths in the measurement report is above a first threshold value and when the connection to the user equipment 10 is active. The handover process may additionally or alternatively be initiated when the difference of the signal strengths is above a second threshold value and when the connection to the user equipment 10 is inactive. The first threshold value is lower than the second threshold value and the first threshold value is associated with the first trigger parameter and the second threshold value is associated with the second trigger parameter.

The first trigger parameter and second trigger parameter may each comprise a parameter influencing a handover margin of signal strengths of the first cell 11 and the second cell 14 in the handover process, and/or a time period to trigger the reporting of signal strengths from the user equipment 10.

The embodiments herein for controlling a handover process of the user equipment 10 from the first cell 11 to the second cell 14 may be implemented through one or more processors, such as a processing circuit 705 in the radio network node 12 depicted in FIG. 7, together with computer program code for performing the functions and/or method steps of the embodiments herein. The program code mentioned above may also be provided as a computer program product, for instance in the form of a data carrier carrying computer program code for performing embodiments herein when being loaded into the radio network node 12. One such carrier may be in the form of a CD ROM disc. It is however feasible with other data carriers such as a memory stick. The computer program code may furthermore be provided as pure program code on a server and downloaded to the radio network node 12.

The radio network node may further comprise a memory 706. The memory 706 may comprise one or more memory units and may be used to store for example data such as trigger parameters, activity data, measurement reports, time periods, applications to perform the methods herein when being executed on the radio network node 12 or similar.

Figure 8:
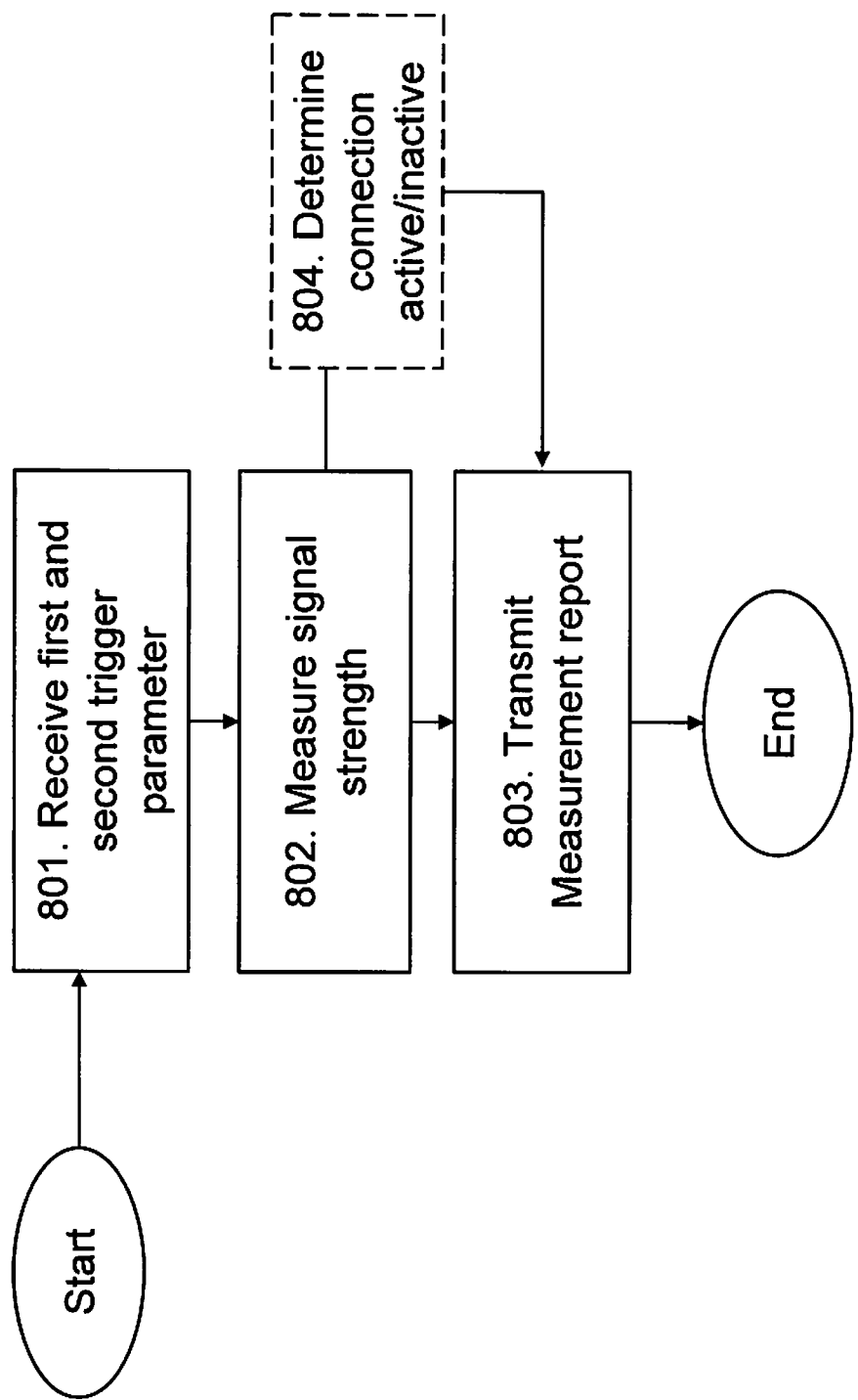
FIG. 8 is a schematic flow chart depicting a method in a user equipment according to some embodiments.

FIG. 8 is a schematic flowchart depicting embodiments of a method in the user equipment 10 for reporting measurement report enabling handover of the user equipment 10 from the first cell 11 to the second cell 14. The user equipment 10 is served in the first cell 11 controlled by the radio network node 12. The steps may be taken in any suitable order. Boxes being dashed indicate that these steps are only performed in some embodiments.

Step 801. The user equipment 10 receives the first trigger parameter and the second trigger parameter from the radio network node. The first trigger parameter triggers a handover process when a connection between the radio network node 12 and the user equipment 10 is active. The second trigger parameter triggers the handover process when the connection is inactive.

Step 802. The user equipment 10 measures signal strengths of the first cell 11 and the second cell 14. This corresponds to the step 307 in FIG. 3.

Step 803. The user equipment 10 transmits a first measurement report indicating the signal strengths of the first cell 11 and the second cell 14 when the first trigger parameter is fulfilled. Additionally, the user equipment 10 transmits a second measurement report indicating signal strengths of the first cell 11 and the second cell (14) when the second trigger parameter is fulfilled. In some embodiments the first measurement report and the second measurement report are indicated with an indicator indicating whether the measurement report is a first or a second measurement report. This corresponds to the step 309 in FIG. 3.

Step 804. The user equipment 10 may in some alternative embodiments determine whether a connection of the user equipment 10 is active or inactive. Based on whether the connection is active or inactive the user equipment 10 may transmit the first measurement report or the second measurement report to the radio network node 12. Here the user equipment 10 may determine the activity based on transmitted or received data over a period of time.

Figure 9:
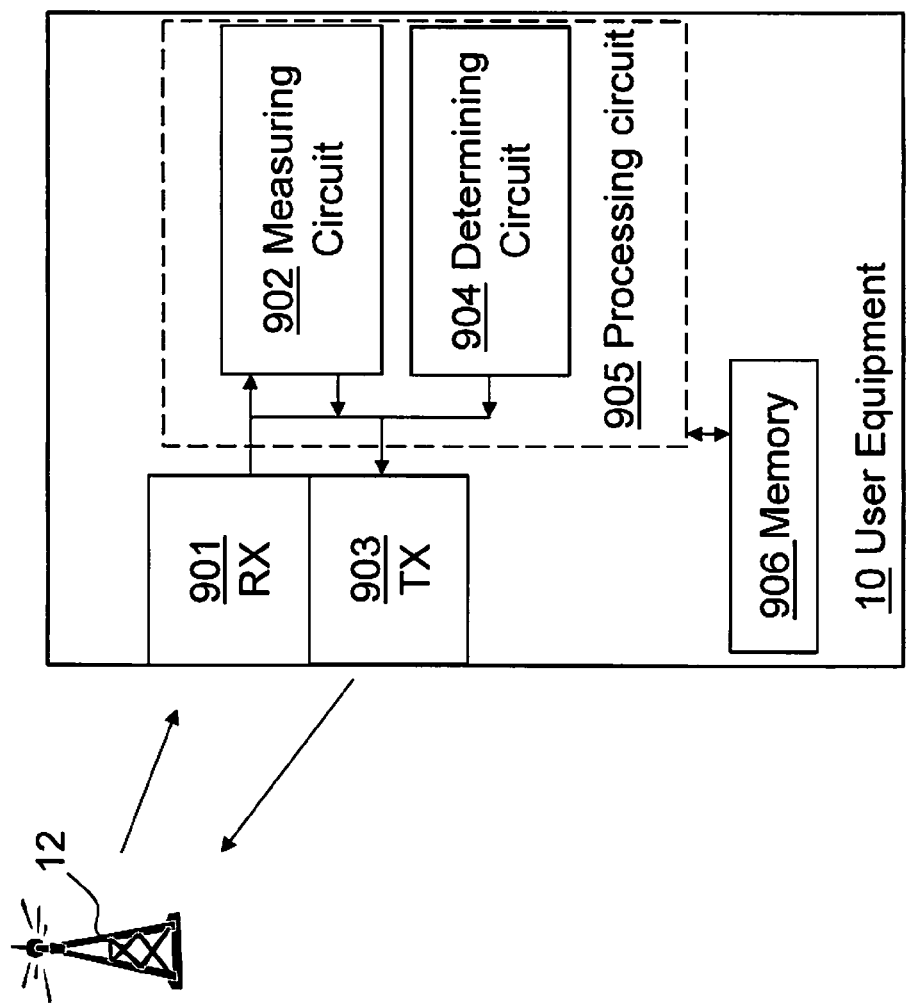
FIG. 9 is a block diagram depicting a user equipment according to some embodiments.

FIG. 9 is a block diagram depicting embodiments of a user equipment for reporting measurement report enabling handover of the user equipment 10 from the first cell 11 to the second cell 14. The user equipment 10 is configured to be served in the first cell 11 controlled by a radio network node 12.

The user equipment comprises a receiver 901 configured to receive a first trigger parameter and a second trigger parameter. The first trigger parameter triggers a handover process when a connection between the radio base station 12 and the user equipment 10 is active. The second trigger parameter triggers the handover process when the connection is inactive.

The user equipment 10 further comprises a measuring circuit 902 configured to measure signal strengths of the first cell 11 and the second cell 14.

The user equipment 10 further comprises a transmitter 903 configured to transmit a first measurement report indicating the signal strengths of the first cell 11 and the second cell 14 when the first trigger parameter is fulfilled. The transmitter is further configured to transmit a second measurement report indicating signal strengths of the first cell 11 and the second cell 14 when the second trigger parameter is fulfilled.

The user equipment 10 may further comprise a determining circuit 904 configured to determine whether a connection of the user equipment 10 is active or inactive. Based on whether the connection is active or inactive the transmitter 903 may be configured to transmit the first measurement report or the second measurement report to the radio network node 12. The user equipment 10 may be configured to indicate with an indicator whether the measurement report is a first or a second measurement report.

The embodiments herein for reporting measurement report enabling handover of the user equipment 10 from the first cell 11 to the second cell 14 may be implemented through one or more processors, such as a processing circuit 905 in the user equipment 10 depicted in FIG. 9, together with computer program code for performing the functions and/or method steps of the embodiments herein. The program code mentioned above may also be provided as a computer program product, for instance in the form of a data carrier carrying computer program code for performing embodiments herein when being loaded into the user equipment 10. One such carrier may be in the form of a CD ROM disc. It is however feasible with other data carriers such as a memory stick. The computer program code may furthermore be provided as pure program code on a server and downloaded to the user equipment 10.

The user equipment 10 may further comprise a memory 906. The memory 807 may comprise one or more memory units and may be used to store for example data such as trigger parameters, signal strengths, measurement reports, threshold values, handover margins, applications to perform the methods herein when being executed on the user equipment 10 or similar.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method in a radio network node comprising:
controlling, by the radio network node, a handover process of a user equipment from a first cell to a second cell, which user equipment is served in the first cell controlled by the radio network node, wherein a first handover process is triggered by a first trigger parameter when a connection to the user equipment is active, and a second handover process is triggered by a second trigger parameter when the connection to the user equipment is inactive;
receiving periodically a measurement report from the user equipment, which measurement report indicates signal strengths of the first cell and of the second cell; and
initiating the first handover process when a difference of the signal strengths in the measurement report is above a first threshold value and when the connection to the user equipment is active, and initiating the second handover process when the difference of the signal strengths is above a second threshold value and when the connection to the user equipment is inactive, which first threshold value is lower than the second threshold value and wherein the first threshold value is associated with the first trigger parameter and the second threshold value is associated with the second trigger parameter.

2. A method according to claim 1, further comprising establishing, by the radio network node, whether the connection to the user equipment is active or inactive.

3. A method according to claim 1, further comprising transmitting, to the user equipment, the first trigger parameter for reporting signal strength measurement from the user equipment, and the second trigger parameter for reporting signal strength measurement from the user equipment.

4. A method according to claim 3, wherein the first trigger parameter indicates a first handover margin and the second trigger parameter indicates a second handover margin, which first handover margin differs from the second handover margin.

5. A method according to claim 3, wherein the first trigger parameter indicates a first time period to report signal measurement, and the second trigger parameter indicates a second time period to report signal measurement, wherein a length of the first time period is different from a length of the second time period.

6. A method according to claim 3, further comprising:
receiving a measurement report indicating whether the measurement report is triggered by the first trigger parameter or the second trigger parameter.

7. A method according to claim 1, further comprising:
transmitting the first trigger parameter to the user equipment when the connection is active or the second trigger parameter to the user equipment when the connection is inactive.

8. A method according to claim 1, wherein the first trigger parameter and second trigger parameter each comprise one or more of a parameter influencing a handover margin of signal strengths of the first cell and the second cell and a time period to trigger the reporting of signal strengths from the user equipment.

9. A method in a user equipment for reporting measurement reports enabling handover of the user equipment from a first cell to a second cell, which user equipment is served in the first cell controlled by a radio network node, the method comprising:
receiving a first trigger parameter and a second trigger parameter, which first trigger parameter triggers a first handover process when a connection between the radio network node and the user equipment is active, and which second trigger parameter triggers a second handover process when the connection is inactive;
measuring signal strengths of the first cell and the second cell; and
transmitting a first measurement report indicating the signal strengths of the first cell and the second cell when the first trigger parameter is fulfilled and a second measurement report indicating signal strengths of the first cell and the second cell when the second trigger parameter is fulfilled, wherein the first handover process is initiated when a difference of the signal strengths in the measurement report is above a first threshold value and when the connection to the user equipment is active, and the second handover process is initiated when the difference of the signal strengths is above a second threshold value and when the connection to the user equipment is inactive, which first threshold value is lower than the second threshold value and wherein the first threshold value is associated with the first trigger parameter and the second threshold value is associated with the second trigger parameter.

10. A method according to claim 9, further comprising:
determining whether a connection of the user equipment is active or inactive, and based on whether the connection is active or inactive, transmitting the first measurement report or the second measurement report to the radio network node.

11. A method according to claim 9, wherein the first measurement report and the second measurement report are indicated with an indicator indicating whether the measurement report is a first or a second measurement report.

12. A radio network node comprises:
an operating circuit configured to control a handover process of a user equipment from a first cell to a second cell, which user equipment is served in the first cell controlled by the radio network node, wherein a first handover process is triggered by a first trigger parameter when a connection to the user equipment is active, and a second handover process is triggered by a second trigger parameter when the connection to the user equipment is inactive;

a receiver configured to periodically receive a measurement report from the user equipment, which measurement report indicates signal strengths of the first cell and of the second cell; and the operating circuit is configured to initiate the first handover process when a difference of the signal strengths in the measurement report is above a first threshold value and when the connection to the user equipment is active, and to initiate the second handover process when the difference of the signal strengths is above a second threshold value and when the connection to the user equipment is inactive, which first threshold value is lower than the second threshold value and wherein the first threshold value is associated with the first trigger parameter and the second threshold value is associated with the second trigger parameter.

13. A radio network node according to claim 12, further comprising:
an establishing circuit configured to establish whether the connection to the user equipment is active or inactive.

14. A radio network node according to claim 12, further comprising:
a transmitter configured to transmit, to the user equipment, the first trigger parameter for reporting signal strength measurement from the user equipment, and the second trigger parameter for reporting signal strength measurement from the user equipment.

15. A radio network node according to claim 14, wherein the first trigger parameter indicates a first handover margin and the second trigger parameter indicates a second handover margin, which first handover margin differs from the second handover margin.

16. A radio network node according to claim 14, wherein the first trigger parameter indicates a first time period to report signal measurement, and the second trigger parameter indicates a second time period to report signal measurement, wherein a length of the first time period is different from a length of the second time period.

17. A radio network node according to claim 14, further comprising:
a receiver configured to receive a measurement report indicating whether the measurement report is triggered by the first trigger parameter or the second trigger parameter.

18. A radio network node according to claim 12, further comprising:
a transmitter configured to transmit the first trigger parameter to the user equipment when the connection is active or the second trigger parameter to the user equipment when the connection is inactive.

19. A radio network node according to claim 12, wherein the first trigger parameter and second trigger parameter each comprise one or more of a parameter influencing a handover margin of signal strengths of the first cell and the second cell and a time period to trigger the reporting of signal strengths from the user equipment.

20. A user equipment for reporting measurement reports enabling handover of the user equipment from a first cell to a second cell, which user equipment is configured to be served in the first cell controlled by a radio network node, the user equipment comprising:
a receiver configured to receive a first trigger parameter and a second trigger parameter, which first trigger parameter triggers a first handover process when a connection between the radio base station and the user equipment is active, and which second trigger parameter triggers a second handover process when the connection is inactive;
a measuring circuit configured to measure signal strengths of the first cell and the second cell; and
a transmitter configured to transmit a first measurement report indicating the signal strengths of the first cell and the second cell when the first trigger parameter is fulfilled and a second measurement report indicating signal strengths of the first cell and the second cell when the second trigger parameter is fulfilled, wherein the first handover process is initiated when a difference of the signal strengths in the measurement report is above a first threshold value and when the connection to the user equipment is active, and the second handover process is initiated when the difference of the signal strengths is above a second threshold value and when the connection to the user equipment is inactive, which first threshold value is lower than the second threshold value and wherein the first threshold value is associated with the first trigger parameter and the second threshold value is associated with the second trigger parameter.

21. A user equipment according to claim 20, further comprising:
a determining circuit configured to determine whether a connection of the user equipment is active or inactive, and based on whether the connection is active or inactive, the transmitter is further configured to transmit the first measurement report or the second measurement report to the radio network node.

22. A user equipment according to claim 20, wherein the user equipment is configured to indicate with an indicator whether the measurement report is a first or a second measurement report.

* * * * *